United States Patent [19]

Calvi

[11] Patent Number: 4,580,144

[45] Date of Patent: Apr. 1, 1986

[54] POSTAL FIXED AND VARIABLE DATA THERMAL PRINTER

[75] Inventor: Salvatore J. Calvi, Ridgefield, Conn.

[73] Assignee: Pitney Bowes Inc., Stamford, Conn.

[21] Appl. No.: 642,214

[22] Filed: Aug. 20, 1984

[51] Int. Cl.[4] .................. G01D 15/10; H05B 3/00; B41J 3/04

[52] U.S. Cl. .................. 346/76 PH; 101/93.07; 101/93.12; 101/109; 101/288; 219/216; 219/469; 219/476; 235/101; 346/24; 400/120

[58] Field of Search .................. 346/76 PH, 24; 355/18; 101/91, 93.07, 93.11, 93.12, 109, 288; 364/900; 400/120; 219/216, 469, 476; 235/101

[56] References Cited

U.S. PATENT DOCUMENTS

| | | | |
|---|---|---|---|
| 3,869,986 | 3/1975 | Hubbard | 101/91 |
| 3,938,095 | 2/1976 | Check, Jr. et al. | 364/900 |
| 4,376,942 | 3/1983 | Toth et al. | 346/76 PH |
| 4,460,676 | 7/1984 | Fabel | 430/333 X |

FOREIGN PATENT DOCUMENTS

| | | | |
|---|---|---|---|
| 2752371 | 6/1979 | Fed. Rep. of Germany | 346/76 PH |

*Primary Examiner*—E. A. Goldberg
*Assistant Examiner*—Gerald E. Preston
*Attorney, Agent, or Firm*—Michael J. DeSha; William D. Soltow, Jr.; Albert W. Scribner

[57] ABSTRACT

The invention features a high speed thermal printing mechanism having a dichotomized printing sequence. The thermal printing mechanism is particularly useful for printing postal values and indicia upon postage tape in a variable and fixed format, respectively. The variable information can be imprinted by a thermal head under the influence of a microprocessor. The fixed information can be imprinted by an etched thermal print screen.

19 Claims, 3 Drawing Figures

POSTAL FIXED AND VARIABLE DATA THERMAL PRINTER

FIELD OF THE INVENTION

The invention relates to microprocessor controlled electronic postage meters, and more particularly to an electronic postage meter having a thermal postage printing mechanism.

BACKGROUND OF THE INVENTION

In the past, electronic as well as mechanical postage printing devices featured rotatable printing drums with settable printing wheels for printing postal values.

More recently, with the advent of automated postage stations, thermal printers have replaced the previous fixed dies for printing postage. The thermal printing mechanisms are uniquely adaptable for use within these automated postage stations, in that they are capable of printing indicia, slogans, postal values, and other postage information in a facile manner. These thermal printing mechanisms are easily controlled by a microprocessor that initiates voltage pulses for heating the thermal printing elements to rapidly provide a postage stamp.

While the thermal printers are relatively fast as compared with the previous mechanical drum printers however, they are relatively slow when printing indicia, such as an eagle stamp, when considering the speed of the microprocessor signals.

This problem results from the large amount of electronic control required to print the eagle indicia upon the stamp.

It has been discovered that the thermal printing of postage can be further speeded by dichotomizing the printing of the postal information in a fixed and variable format.

The variable postage data such as postal value and date is easily iniltiated through electronic input to a thermal head printer as previously accomplished.

However, this invention now contemplates the thermal printing of indicia such as the eagle stamp, postage meter identification number and optional slogan, as fixed information. This fixed information is now thermally printed separately from the variable, electronically controlled data by another thermal printer having a fixed unalterable thermal printing screen carried by a rotatable drum.

The two separate thermal printings form a composite of the final complete postage stamp by maintaining proper sequential registration between fixed and variable printings.

The above bifurcated arrangement not only provides for a speedier thermal printing of postage, but also has the further advantage of providing better postage meter security. This is accomplished by the fact that the meter number and eagle indicia have a unique design and are additionally in place within the system. Such indicia cannot be easily altered or modified within the course of normal postage meter operation.

DISCUSSION OF RELATED ART

In U.S. Pat. No. 4,446,467, issued to Ryohei Takiguchi et al, on May 1, 1984, a heat sensitive recording sheet is disclosed. The recording sheet is print activated by means of a flash lamp operating in the light range of 400–550 nm.

The Takiguchi et al invention does not contemplate the possible use of a flash lamp for the purpose of providing heat to transfer ink from a printing ribbon which is in operational contact between an etched screen and a postage tape.

The Takiguchi et al patent also teaches the use of a print head to produce a variable printing pattern in response to a microprocessor controlled signal.

While the presently disclosed invention utilizes a thermal head to print variable printing information, it also has a separate etched screen printing mechanism that is sequentially operated along with said thermal head to provide a composite stamp in a more rapid and secure manner.

In U.S. Pat. No. 3,934,503, issued to Layton C. Kinney et al, on Jan. 27, 1975, a thermal stencil screen is shown for the production of lithographic or silk screen plates by means of igniting and removing ink impervious areas disposed upon the print plate master.

The presently disclosed invention by contrast has a fixed indicia printing screen that allows light to pass therethrough to melt and transfer ink from a ribbon to a postage tape in select areas of the pattern.

SUMMARY OF THE INVENTION

The invention pertains to an electronic postage meter featuring a thermal postage printing mechanism. The thermal printing mechanism prints postage indicia and postal values in a respective fixed and variable format.

A first thermal printing means generally comprises a rotatable drum having an etched screen on its peripheral surface containing fixed indicia, such as a pattern of an eagle. A heat source within the drum projects energy through open portions of the screen to transfer ink from a ribbon to a postage tape.

A second thermal printing means disposed adjacent the first printing means generally comprises a printing head that prints variable postage information, such as postal values, in response to voltage pulses initiated by electronic signals.

The first and second thermal printers act in concert to produce a composite postage print.

A postage tape dispenser provides tape to a feed mechanism that carries the tape along a feed path past the first and second thermal printers.

A thermal ink transfer ribbon is likewise dispensed and carried along a portion of the feed path containing the thermal printers in order to deposit ink on the tape in specific format.

A microprocessor controls the voltage pulses provided to the second thermal printer that generally contains a printing head having individual heating elements.

The desired postage to be printed is entered into a keyboard that is electrically connected to the microprocessor and that provides electronic signals to initiate the voltage pulses.

A display is also connected to the keyboard to indicate the selected postage value.

A slogan can be optionally printed by the drum of the first thermal printer, which has the means for inserting a second screen.

A cutting mechanism disposed upstream from the first and second thermal printers has the capability of cutting different tape lengths in accordance with the optional printing of a slogan.

It is an object of this invention to provide an improved electronic postage meter having a thermal printing mechanism.

It is another object of the invention to provide an improved, high speed thermal printing mechanism that prints a composite postage stamp comprising both fixed and variable information.

These and other objects of this invention will be better undertsood and will become more apparent with reference to the subsequent detailed description considered in conjunction with the accompanying drawings.

DETAILED DESCRIPTION OF THE INVENTION

Generally speaking, the electronic postage meter of this invention features a high speed thermal printing mechanism that provides a composite stamp comprising both fixed and variable thermally printed information.

High speed is achieved by eliminating the former complex electronic control necessary to replicate ornamental indicia or logos. Such indicia is now, according to this invention, thermally printed by an unalterable etched screen supported upon a rotating drum. Variable information is electronically controlled by a microprocessor and thermally printed in the spaces provided in the already printed fixed design.

For the purposes of brevity, like elements will be provided with the same designation throughout the subsequent description.

Figure 1:
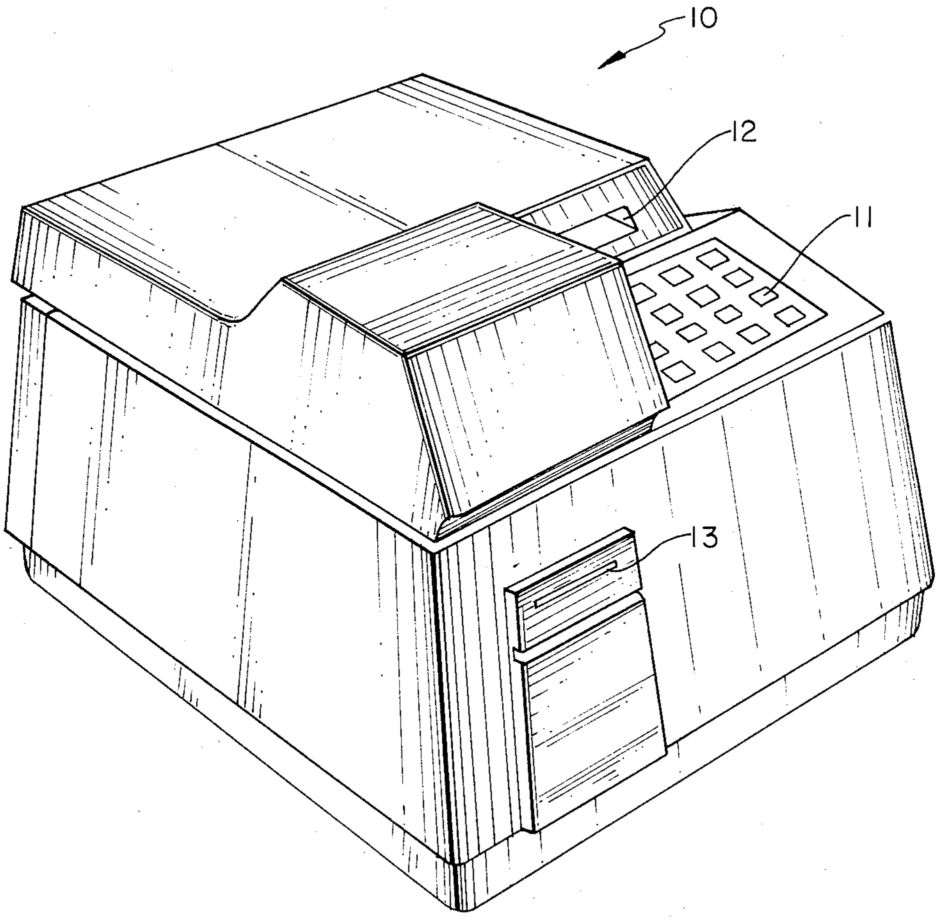
FIG. 1 is a perspective view of an electronic postage meter in accordance with this invention.

Now referring to FIG. 1, an electronic postage meter 10, of a type contemplated by this invention, is illustrated. The postage meter 10 is provided with a keyboard 11 for introducing into the system variable information, such as the postage selected to be printed. A display 12 is electrically connected to the keyboard 11 for indicating the selected and printed postage and for informing the user of account balances and other operating information. Similar keyboards and displays are shown and described in U.S. Pat. No. 3,938,095, issued to Frank Check, Jr. et al, the disclosure of which is meant to be incorporated herein by way of reference. The postage meter 10 has a slot 13 from which the printed postage tape (not shown) is ejected.

Input and output jacks may be provided to connect peripheral equipment to the postage meter 10 as required, such as telecommunications equipment.

Figure 2:
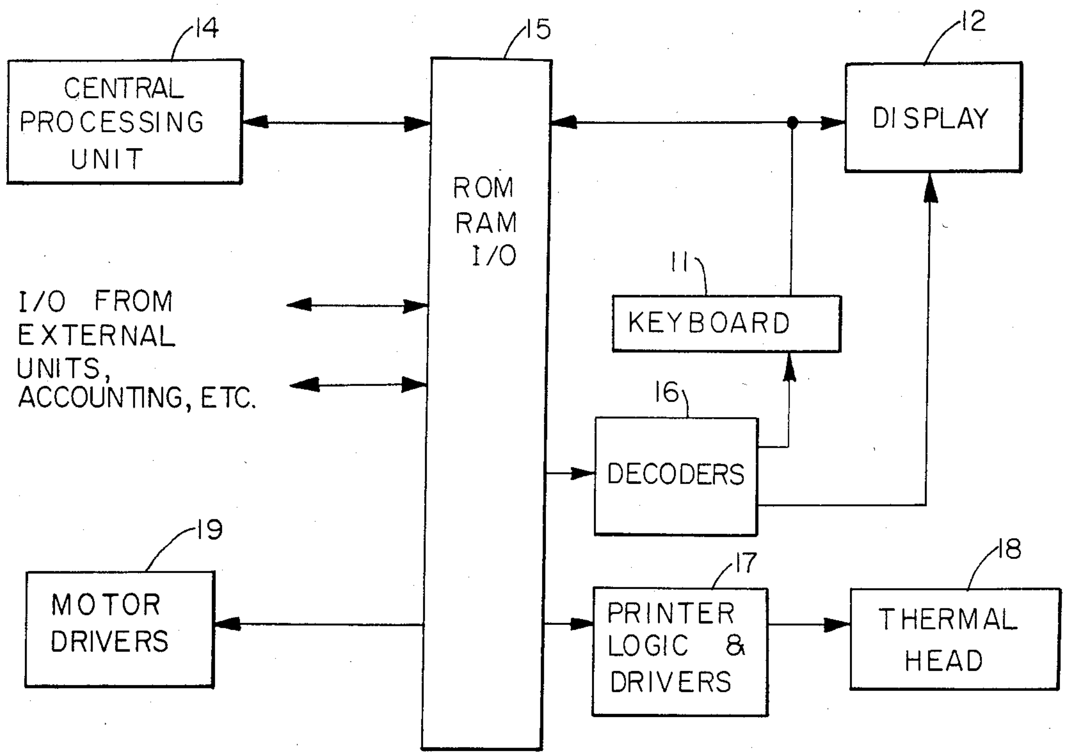
FIG. 2 is a block diagrammatic view of the electronic system of the postage meter of FIG. 1.

Referring to FIG. 2, a schematic diagram of the electronic controls for the postage meter 10 of FIG. 1, is depicted.

The meter 10 is preferably operated by means of a microprocessor, of which the central processing unit (CPU) 14 is the operating center of the system.

The multi-purpose ROM/RAM 10 device 15 connects to the CPU 14 through a conventional bus. The keyboard 11 and display 12 are likewise connected, and are scanned and driven by decoders 16 in a conventional manner to enable input and readout functions.

Other peripheral equipment can likewise be connected into the system through device 15.

Figure 3:
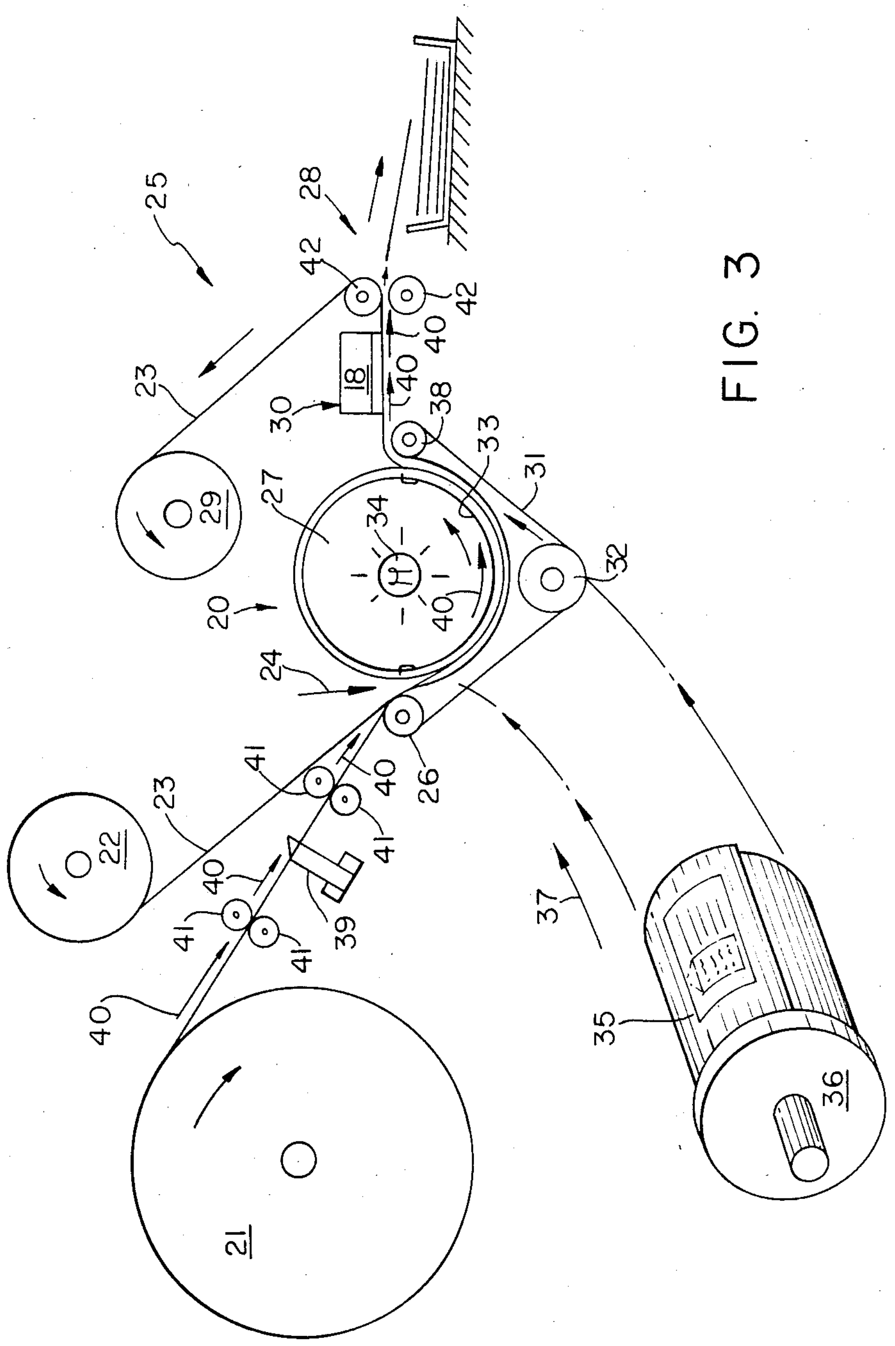
FIG. 3 is a schematic view of the thermal printing mechanism for the postage meter of FIG. 1.

Printer logic and driver circuits 17 receive information from the ROM/RAM 10 device 15 and translate these electrical signals into suitable, sequential voltage pulses to heat the thermal heating elements in the thermal printing head 18 of the variable information printing station 30 of the thermal printing mechanism shown in FIG. 3.

The thermal printing head 18 can be one of the type available commercially from RICOH Company LTD., San Jose, Calif., or KYOCERA Company, Kyoto, Japan. Such a typical printing head is shown and described in U.S. Pat. No. 4,429,318, issued Jan. 31, 1984, to Kobata.

In the print head 18 at the variable information print station 30 of FIG. 3, it is preferable that the heating elements be formed in a single row and arranged perpendicular to the direction of travel of a paper postage tape, as described hereinafter. For best results, there are about 224 elements in the row. The elements are heated as required for the purpose of melting an ink composition on a thermal transfer ribbon 23 (FIG. 3). The ink on the transfer ribbon is caused to be lifted off the ribbon at the point of heating and transferred to the paper postage tape traveling in conjunction with the thermal postage tape. The CPU 14 controls the sequencing of motor drivers 19 which are used to dispense the tape and ink ribbon, as will be described in more detail with respect to the print mechanism, depicted in FIG. 3.

Referring now to FIG. 3, the thermal printing mechanism 25 comprises two, adjacent thermal printing stations 20 and 30, respectively. The thermal printing stations 20 and 30 are disposed along a postage tape feed path, defined by arrows 40. The first printing station 20 thermally prints the fixed indicia, such as the postage eagle insignia, upon the postage tape. The second printing station 30, as aforementioned, thermally prints the variable postage information, such as postage value, upon the postage tape.

Printing stations 20 and 30 operate in sequence and are electrically and mechanically in registration with each other, such that the two printings upon the tape properly form a composite, or completed postage stamp.

The postage tape is dispensed from a tape supplying roll 21 at the lefthand side of mechanism 25. The roll 21 is rotatively driven by one of the motor drivers 19, previously mentioned in the exposition of the circuitry of FIG. 2. Another motor driver 19 is utilized to dispense a thermal ink transfer ribbon 23 from supply spool 22 by driving take-up spool 29, as shown.

The dispensed ink transfer ribbon 23 meets the postage tape at the nip 24 created by the support roller 26 and thermal printing drum 27. From here, the ribbon 23 and the postage tape are carried together forwardly along the tape feed path 40 past printing stations 20 and 30, with the imprinted postage tape ejecting at point 28, corresponding to ejection slot 13 of FIG. 1, and the spent transfer ribbon 23 being stored upon take-up spool 29.

The fixed information printing station 20 comprises an idler belt 31 carried by three rollers 26, 32, and 38 of which roller 32 may be rotatively driven. The idler belt 31 provides support for the postage tape as it is carried into and out of contact with the thermal printing drum 27.

The thermal printing drum 27 has an "eagle" indicia etched in a screen 33 carried by one-half the circumference of the outer drum surface. A heat or flash lamp 34 is disposed at the center of the drum, and irradiates the thermal ink transfer ribbon 23 through the open spaces in the etched screen 33. The image of the "eagle" is transposed by the melting ink of the ribbon which is henceforth transferred to the postage tape disposed adjacently the transfer ribbon 23.

The drum 27 is made to rotate counterclockwise one complete revolution for each section of postage tape with which it comes in contact.

The drum 27 has an open window over one-half of its circumference that may be filled with another etched screen carrying a slogan and/or logo. The slogan screen 35 is carried by a drum insert member 36, which is introduced (arrow 37) into the drum 27 with screen 35 placed opposite the screen 33. The resulting structure, therefore, fills the entire circumferential surface of drum 27, and the slogan is printed along side of the "eagle" indicia.

As will be obvious to the skilled practitioner, the slogan will require a tape segment of double length. This is accomplished by the cutter blade 39 located upstream of the thermal printing station 20. As the tape supply roll 21 dispenses the postage tape, the tape is caused to move between feed rollers 41, which are driven in synchronism with printing drum 27 and the tape supply roll 21. In normal operation, the cutter blade 39 located between feed rolls 41 will cut a standard tape segment. When the slogan insert member 36 is in place within drum 27, a switch or sensor (not shown) in the drum 27 will cause the supply roll 21 and the cutter blade 39 to provide a double length of tape.

This operation may also be programmed through the keyboard 11 and the microprocessor circuitry of FIG. 2, where the user wants the option of only printing the slogan at specific times.

The postage tape after having been imprinted with fixed information at printing station 20, will them move to the variable information printing station 30, as aforementioned.

As the postage tape is traveling past the thermal head 18, the thermal transfer ribbon 23 is also traveling in conjunction with the tape. In response to output commands from the microprocessor, the thermal elements of the thermal head 18 are heated in a patterned sequence to create the desired image line-by-line on the tape traveling past the head as the ink coating on the thermal transfer ribbon is heated and lifted from the thermal transfer ribbon and deposited on the paper tape. The microprocessor will initiate the proper voltage pulses to actuate the heating elements in the print head 18. The variable information will be imprinted upon the postage tape in the open spaces provided within the alrady printed indicia.

The postage tape is then discharged from between discharge rollers 42, and the spent transfer ribbon 23 is stored on reel 29.

The upper discharge roller 42 is spring biased to provide tension in the ribbon 23, for proper feed and storage purposes.

It will be understood that the drawings and description of this invention are exemplary, and are meant only to provide an understanding and best mode explanation of the invention.

Having thus described the invention, what is desired to be protected by Letters Patent is presented by the following appended claims.

What is claimed is:

1. An electronic postage meter having a thermal postage printing mechanism for the printing of postage indicia and postal values in a respective fixed and variable format, said thermal postage printing mechanism comprising:

means for defining a postage tape feed path;

means for dispensing postage tape along said path;

a first thermal printing means disposed along said feed path for printing fixed postage indicia upon said postage tape, said first thermal printing means including a heat source and a rotatable drum substantially surrounding said heat source, said rotatable drum supporting an etched screen containing said fixed indicia;

a second thermal printing means disposed adjacent said first thermal printing means for printing variable postage information upon said postage tape, said second thermal printing means including thermal heating elements responsive to voltage pulses initiated by electronic signals related to a postage value; and means for dispensing a thermal ink transfer ribbon between said first and second thermal printing means and said postage tape, wherein ink from said ribbon is transferred to said postage tape by said first and second thermal printing means to form a composite postage print.

2. The electronic postage meter of claim 1, wherein said postage tape dispensing means is capable of dispensing two different lengths of postage tape.

3. The electronic postage meter of claim 1, wherein said heat source includes a flash lamp.

4. The electronic postage meter of claim 1, further comprising a microprocessor for initiating said voltage pulses for said second thermal printing means.

5. The electronic postage meter of claim 4, further comprising a keyboard for selecting postage, said keyboard being electrically connected to said microprocessor and supplying electronic signals to initiate said voltage pulses.

6. The electronic postage meter of claim 5, further comprising a display electrically connected to said keyboard for displaying selected postal values.

7. The electronic postage meter of claim 1, further comprising cutting means disposed along said feed path for cutting said postage tape into a given length.

8. The electronic postage meter of claim 7, wherein said cutting means is disposed along said feed path upstream from said first and second thermal printing means.

9. The electronic postage meter of claim 1, wherein said drum comprises means for inserting an additional screen for printing a slogan upon said postage tape.

10. An electronic postage meter having a thermal postage printing mechanism for the printing of postage indicia and postal values in a respective fixed and variable format, said thermal postage printing mechanism comprising:

means defining a postage tape feed path;

means for dispensing postage tape along said feed path;

a first thermal printing means disposed along said feed path for printing fixed postage indicia upon said postage tape, said first thermal printing means including a heat source and a rotatable drum substantially surrounding said heat source, said rotatable drum supporting an etched screen containing said fixed indicia;

a second thermal printing means disposed adjacent said first thermal printing means for printing variable postage information upon said postage tape, said second thermal printing means including thermal heating elements responsive to voltage pulses initiated by electronic signals related to a postal value, said first and second thermal printing means operating in concert with a thermal ink transfer ribbon between said first and second thermal printing means and said type to form a composite postage print.

11. The electronic postage meter of claim 10, wherein said first and second thermal printing means comprises a dispensing means for placing a thermal ink transfer ribbon adjacent said postage tape.

12. The electronic postage meter of claim 10, wherein said heat source comprises a flash lamp.

13. The electronic postage meter of claim 10, further comprising a microprocessor for initiating said voltage pulses for said second thermal printing means.

14. The electronic postage meter of claim 13, further comprising a keyboard for selecting postage, said keyboard being electrically connected to said microprocessor and supplying electronic signals to initiate said voltage pulses.

15. The electronic postage meter of claim 14, further comprising a display electrically connected to said keyboard for displaying selected postal values.

16. The electronic postage meter of claim 10, further comprising cutting means disposed along said feed path for cutting said postage tape into a given length.

17. The electronic postage meter of claim 16, wherein said cutting means has the capability of cutting said postage tape into different lengths.

18. The electronic postage meter of claim 10, wherein said drum includes means for inserting an additional screen for printing a slogan.

19. A printing mechanism for the printing of indicia and numerical values in a respective fixed and variable format, said thermal printing mechanism comprising:

means defining a tape feed path;

means for dispensing tape along said feed path;

a first thermal printing means disposed along said feed path for printing fixed indicia upon said tape, said first thermal printing means including a heat source and a rotatable drum substantially surrounding said heat source, said rotatable drum supporting an etched screen containing said fixed indicia;

second thermal printing means disposed adjacent said first thermal printing means for printing variable information upon said tape, said second thermal printing means including thermal heating elements responsive to voltage impulses initiated by electronic signals related to a numerical value; and means for dispensing a thermal ink transfer ribbon between said first and second thermal printing means and said tape, wherein ink from said ribbon is transferred to said tape by said first and second thermal printing means to form a composite print.

* * * * *